Feb. 23, 1926.
R. D. WEATHERELL
1,573,884
LIGHT, PORTABLE, COLLAPSIBLE BABY CAR
Filed August 26, 1924   2 Sheets-Sheet 2
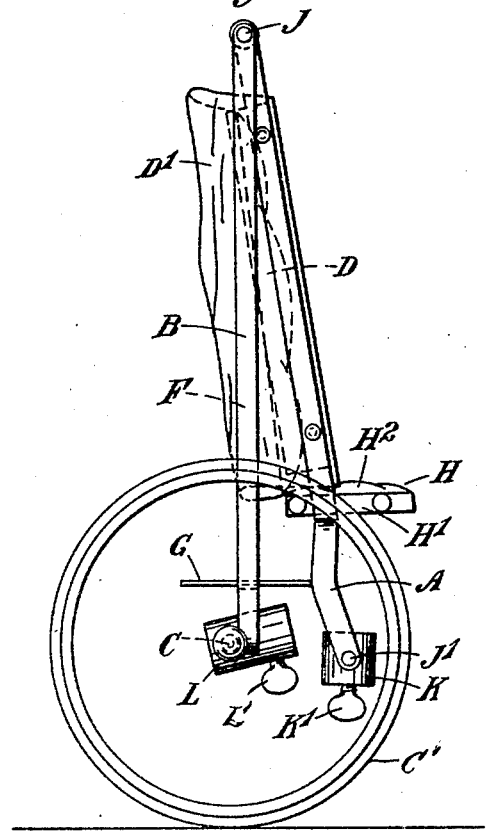
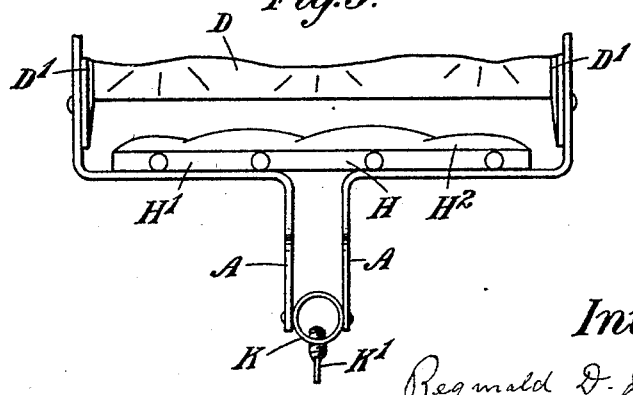
Inventor.
Reginald D. Weatherell
By Church & Church
His Attys Patented Feb. 23, 1926.

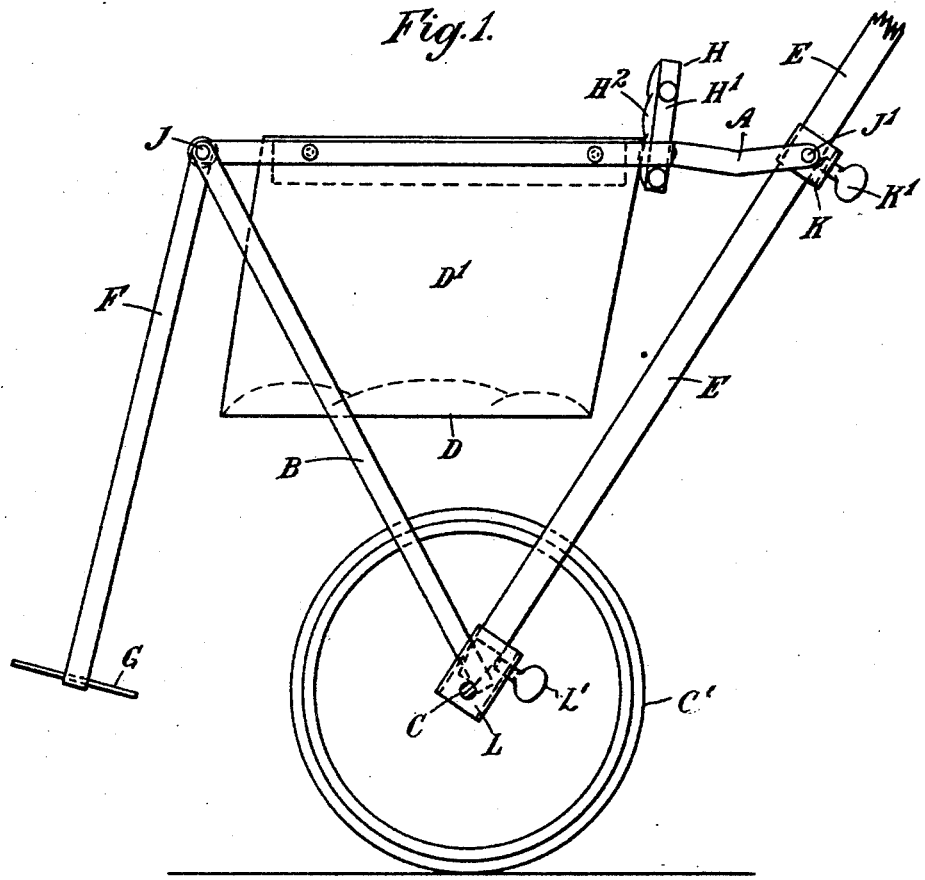

1,573,884

UNITED STATES PATENT OFFICE.

REGINALD DIXON WEATHERELL, OF LONDON, ENGLAND.

LIGHT, PORTABLE, COLLAPSIBLE BABY CAR.

Application filed August 26, 1924. Serial No. 734,264.

*To all whom it may concern:*

Be it known that REGINALD DIXON WEATHERELL, citizen (or subject) of the King of Great Britain, residing at 19, Grosvenor Road, London, W. 4, England, has invented certain new and useful Improvements in Light, Portable, Collapsible Baby Cars, of which the following is a specification.

This invention relates to light, portable, collapsible baby cars and has for its chief object to provide a car of this kind which can be collapsed into small bulk for easy transport or set up for use, quickly and easily and while light, inexpensible and simple in construction will be strong, reliable and comfortable.

According to the present invention the car comprises two longitudinal seat supporting members, two carrying members pivotally connected or hinged to the seat supporting members and to a wheel carrying axle and a combined staying and propelling member or stick adapted to be detachably coupled with the seat supporting members and with the wheel axle.

Referring to the accompanying drawings:—

Fig. 1 is a side elevation showing the erected or ready for use position.

Fig. 2 is a side elevation showing the car collapsed for carrying or transportation, and Fig. 3 is a detailed plan view.

A are the longitudinal members.

B are the downwardly extending members. C is the wheel axle. D is the seat. E is the walking or other stick which retains the members A and B in proper relative position. F are the members carrying the foot rest. G is the foot rest and H is the back support.

The body or main frame of the car comprises the two longitudinal or seat carrying members A, which are conveniently formed of a strip of steel, iron or other appropriate material and are preferably arranged parallel to each other from the front of the car to the back rest H. Between the forward ends of the members A is mounted a transverse member J which is conveniently in the form of a wooden rod or bar but may be a steel or other tube, bar or rod. This transverse member J serves to prevent the child falling forward and also serves in the collapsed or folded position of the car as a ready means for carrying the car (see Fig. 2). The two parallel members A, at a point behind the back rest H are bent or turned inwardly at right angles to their parallel parts (see Fig. 3) and serve as a support for the back rest. The rear portions of the members A are bent parallel to each other and at their extreme rear ends carry the socket, clip or other fastening for stick or other propelling member.

The members A may be parallel to each other throughout their entire length their rear ends being coupled by a second transverse member.

Depending from the front ends of the members A are the two parallel members B which are pivotally connected respectively to the opposite ends of the transverse member J or to the ends of the members A and at their lower ends are pivotally connected to the wheel axle C.

In the position for use, the members B, extend downwardly and rearwardly to the wheel axle C which is conveniently situated a little behind the centre of the seat D.

The seat D which may comprise a cushion or may be upholstered is slung by its opposite ends from the upper members A by pieces of leather, fabric or other appropriate material $D^1$ which may be connected or secured to the upper members A by means of straps, tapes or other devices.

To the outer ends of the axle C are connected two light wheels $C^1$, preferably of the disc type with appropriate tyres and these wheels may be held in position on the axle in any suitable manner.

The members A and B are retained in proper relative position and the structure kept rigid by the use of an ordinary walking or other stick or rod which can be readily and quickly secured to the wheel axle C and to the members A so that this stick or rod also acts as a propelling member for the car.

To enable this to be done there is mounted upon the axle C a socket clip or other appropriate clamping or fastening device K.

In the embodiment illustrated, the clamping device K is in the form of a short tube or a sleeve or ring, supported between the rear ends of the members A and is provided with a thumb or clamping screw $K^1$.

The rear ends of the members A are as already stated bent inwards so as to come close together, (see Fig. 3) and the socket K is pivotally secured thereto by two studs $J^1$ the outer ends of which pass through openings in the ends of the members A and the inner ends of the studs pass into the ring K and act as pivots so that when the car is collapsed the clamping device K can be turned down, (see Fig. 2).

The lower clamping device L is also in the form of a tubular socket through the lower end of which the axle C passes. This clamping device is also provided with a clamping or thumb screw L¹.

In the position for use, the lower end of a walking or other stick E is passed down through the clamping device K and into the clamping device L. The thumb screw L¹ is then tightened on to the lower end of the stick E after which the members A are placed in the requisite position and the clamping screw K¹ is then tightened on to the stick E.

The members A and B are so proportioned and contrived that when the car is in use the angle at which the stick E inclines is suitable for the user to propel the car comfortably while maintaining the seat approximately parallel with the ground.

The back support or rest H conveniently comprises a base H¹ and carries a cushion H² or it may be upholstered in front. In the example shown the rest is rigidly secured to the members A, but it may be pivotally supported thereon so that, when the car is not in use the back rest may be turned in flat between the members A. The back rest may also be adjustable.

The two supports F for the foot rest G are, like the members A and B made from strips of steel or iron. These supports F may be formed from a single strip or length of material having two links and a transverse piece to which the foot rest is secured.

The upper ends of the members F are pivotally supported to the front transverse member J or to the members A. The foot rest G consists preferably of a thin board, and although it is shown rigidly connected to the supports F it may be so connected thereto as to be capable of being folded parallel with these supports.

The supports F and footrest G may act as a support or rest for the car by allowing the rest G to come into contact with the ground.

A piece of fabric or other appropriate material may extend from the front of the seat D to the front rest G to provide a leg support. This piece of material may serve to carry the foot rest G in which case the supports F may be dispensed with, if not required for temporary supports or stays for the car.

The supports A and B and also the supports F may each comprise two pieces hinged or otherwise connected together so that the car when collapsed can be folded still smaller and if a combined support and propelling member other than an ordinary walking stick is desired it may be of a tubular or telescopic nature.

The car, according to the present invention when erected forms a perfectly rigid, substantial strong and yet very light baby car. It thus dispenses with the usual method of having to carry a child and it can be taken on trams, buses, trains, tubes or anywhere desired.

It can be produced at very low price and in addition to being very light an ordinary walking stick can be incorporated with it, thus providing an additional convenience for men to use.

The present invention provides an efficient yet very light, portable and collapsible baby car which will enable parents to take children anywhere. The car is so constructed, that when not in use, by the releasing of the two screws or the like and the withdrawal of the stick or rod E, which is preferably an ordinary walking stick the frame folds flat and small, and as it weighs only a few pounds, it can be carried anywhere and takes up very little space, while the stick can then be used as an ordinary walking stick. The operation of setting up or collapsing the car occupies a few seconds only.

When the car is not in use the stick or rod is withdrawn and the upper longitudinal members, the downwardly extending members and the foot rest carrying members are brought together and practically parallel with each other while the seat which is carried preferably by fabric or flexible material folds within the frame members.

What I claim is:—

1. In a light portable collapsible baby car, the combination with two longitudinal seat carrying members, a transverse member connecting the forward ends of said longitudinal members, a wheel carrying axle, two supporting members pivotally and permanently connected to said transverse member and to said axle, and a supporting and propelling member detachably connected to the axle and to said seat carrying members for maintaining the seat carrying members and the supporting members in proper spaced relation.

2. In a light portable collapsible baby car, the combination with two longitudinal seat carrying members, a transverse member connecting the forward ends of said longitudinal members, a wheel carrying axle, two supporting members pivotally and permanently connected to said transverse member and to said axle, a propelling member detachably secured to the axle and to the rear end portions of the seat carrying members for maintaining said seat carrying members and the two supporting members in proper spaced relation, and a foot rest suspended from the forward transverse member connecting the forward ends of the longitudinal seat carrying members.

3. In a light portable collapsible baby car, a pair of longitudinal seat carrying members, a transverse member on which said seat carrying members are pivoted, a wheel carrying axle, two main supporting members pivotally mounted on said axle and pivotally connected to said transverse member, and a spacer and propelling member detachably connected to said axle and said seat supporting members, said seat supporting members being collapsible to a position substantially parallel to the main supporting members pivoted on the axle solely by detaching said spacer and propelling member.

4. In a light portable collapsible baby car, a pair of longitudinal seat carrying members, a transverse member on which said seat carrying members are pivoted, a wheel carrying axle, two main supporting members pivotally mounted on said axle and pivotally connected to said transverse member, depending foot rest means pivoted on said transverse member, and a spacer and propelling member detachably connected to said axle and to said seat supporting members, said seat supporting members and said foot rest supporting means being free to turn on said transverse member and to assume a collapsed position substantially parallel to the two main supporting members solely by detaching said spacer and propelling member.

In testimony whereof he affixes his signature.

REGINALD DIXON WEATHERELL.